(12) United States Patent
Shimizu et al.

(10) Patent No.: US 11,077,529 B2
(45) Date of Patent: Aug. 3, 2021

(54) WHEEL ALIGNMENT ADJUSTMENT SYSTEM

(71) Applicants: TOYOTA JIDOSHA KABUSHIKI KAISHA, Toyota (JP); SHINMEI INDUSTRY CO., LTD., Aichi (JP)

(72) Inventors: Koji Shimizu, Nissin (JP); Yohei Tanaka, Toyota (JP); Chiaki Yoshiwara, Toyota (JP)

(73) Assignees: TOYOTA JIDOSHA KABUSHIKI KAISHA, Toyota (JP); SHINMEI INDUSTRY CO., LTD., Aichi (JP)

( * ) Notice: Subject to any disclaimer, the term of this patent is extended or adjusted under 35 U.S.C. 154(b) by 293 days.

(21) Appl. No.: 16/393,058

(22) Filed: Apr. 24, 2019

(65) Prior Publication Data

US 2019/0366494 A1  Dec. 5, 2019

(30) Foreign Application Priority Data

Jun. 1, 2018 (JP) .............................. JP2018-105973

(51) Int. Cl.
*B23P 19/10* (2006.01)
*B23P 19/06* (2006.01)
(Continued)

(52) U.S. Cl.
CPC .............. *B23P 19/10* (2013.01); *B23P 19/06* (2013.01); *B60S 5/00* (2013.01); *G01B 11/2755* (2013.01); *B23P 2700/50* (2013.01); *B25J 9/1687* (2013.01)

(58) Field of Classification Search
CPC ....... B23P 19/10; B23P 19/06; B23P 2700/50; B62D 17/00; B60S 5/00; G01B 11/2755; G01B 2210/14; B25J 9/1687
See application file for complete search history.

(56) References Cited

U.S. PATENT DOCUMENTS 4,577,534 A * 3/1986 Rayne ................. B25B 27/0035
280/86.755
4,971,352 A * 11/1990 Jordan ................. B60G 13/006
280/86.754

(Continued)

FOREIGN PATENT DOCUMENTS

JP  01-104871 U  7/1989
JP  07-014127 Y2  4/1995
(Continued)

*Primary Examiner* — Bayan Salone
(74) *Attorney, Agent, or Firm* — Sughrue Mion, PLLC (57) ABSTRACT

A control device acquires a first two-dimensional position of a cam bolt and a locknut in a first direction based on a first actual image captured by a first camera, and based on the acquired first two-dimensional position, the control device moves an adjustment socket to a position where the adjustment socket is fittable to a head of the cam bolt and moves a tightening socket to a position where the tightening socket is fittable to the locknut. Then, the control device acquires a second two-dimensional position of the cam bolt and the locknut in a second direction based on a second actual image captured by a second camera, and corrects, based on the acquired second two-dimensional position, a position of the adjustment socket relative to the head of the cam bolt and a position of the tightening socket relative to the locknut.

3 Claims, 6 Drawing Sheets

(51) Int. Cl.
  *B60S 5/00* (2006.01)
  *B25J 9/16* (2006.01)
  *G01B 11/27* (2006.01)
  *B62D 17/00* (2006.01)
  *G01B 11/275* (2006.01)

(56) References Cited

U.S. PATENT DOCUMENTS

| | | | | |
|---|---|---|---|---|
| 5,382,043 A * | 1/1995 | Jordan | ............... | B60G 15/07 |
| | | | | 280/86.753 |
| 5,675,515 A * | 10/1997 | January | ............... | G01B 11/275 |
| | | | | 356/139.09 |
| 5,870,315 A * | 2/1999 | January | ............... | G01B 11/2755 |
| | | | | 700/279 |
| 5,978,077 A * | 11/1999 | Koerner | ............... | G01B 11/275 |
| | | | | 356/139.09 |
| 6,298,284 B1 * | 10/2001 | Burns, Jr. | ............... | G01B 11/275 |
| | | | | 356/139 |
| 6,690,456 B2 * | 2/2004 | Bux | ............... | G01B 11/275 |
| | | | | 33/203.18 |
| 7,864,309 B2 * | 1/2011 | De Sloovere | ............... | G06T 7/521 |
| | | | | 356/139.09 |
| 7,937,844 B2 * | 5/2011 | Rogers | ............... | H04N 7/181 |
| | | | | 33/203.18 |
| 7,982,766 B2 * | 7/2011 | Corghi | ............... | G01B 11/2755 |
| | | | | 348/140 |
| 8,032,279 B2 * | 10/2011 | Rogers | ............... | G01B 11/2755 |
| | | | | 701/36 |
| 8,107,062 B2 * | 1/2012 | De Sloovere | ............... | G06T 7/521 |
| | | | | 356/139.09 |
| 9,715,730 B2 * | 7/2017 | Suzuki | ............... | G01B 11/002 |
| 10,072,926 B2 * | 9/2018 | Rogers | ............... | B60R 11/04 |
| 10,371,509 B2 * | 8/2019 | Rogers | ............... | H04N 5/247 |
| 10,480,937 B2 * | 11/2019 | Rajupillai | ............... | G01B 11/2755 |
| 10,508,907 B2 * | 12/2019 | Rogers | ............... | G01B 11/2755 |
| 10,670,392 B2 * | 6/2020 | Rogers | ............... | G01B 11/2755 |
| 2003/0187610 A1 * | 10/2003 | Dorrance | ............... | G01B 11/2755 |
| | | | | 702/151 |
| 2005/0021198 A1 * | 1/2005 | Jackson | ............... | G01B 11/2755 |
| | | | | 701/33.4 |
| 2005/0078304 A1 * | 4/2005 | Dorrance | ............... | G01B 11/275 |
| | | | | 356/139.09 |
| 2008/0016707 A1 * | 1/2008 | Rogers | ............... | H04N 7/181 |
| | | | | 33/203.18 |
| 2008/0273194 A1 * | 11/2008 | De Sloovere | ............... | G01B 11/2755 |
| | | | | 356/139.09 |
| 2009/0030558 A1 * | 1/2009 | Rogers | ............... | G01B 11/2755 |
| | | | | 700/297 |
| 2011/0102779 A1 * | 5/2011 | De Sloovere | ............... | G01B 11/25 |
| | | | | 356/139.09 |
| 2014/0009582 A1 * | 1/2014 | Suzuki | ............... | G06T 7/564 |
| | | | | 348/46 |
| 2017/0097229 A1 * | 4/2017 | Rogers | ............... | G01B 11/275 |
| 2017/0219340 A1 * | 8/2017 | Rajupillai | ............... | G06T 7/0004 |
| 2018/0340772 A1 * | 11/2018 | Rogers | ............... | B60S 5/00 |

FOREIGN PATENT DOCUMENTS

| | | |
|---|---|---|
| JP | 2014-013147 A | 1/2014 |
| JP | 6080407 B2 | 2/2017 |
| JP | 2017-197030 A | 11/2017 |

* cited by examiner

WHEEL ALIGNMENT ADJUSTMENT SYSTEM

INCORPORATION BY REFERENCE

The disclosure of Japanese Patent Application No. 2018-105973 filed on Jun. 1, 2018 including the specification, drawings and abstract is incorporated herein by reference in its entirety.

BACKGROUND

1. Technical Field

The disclosure relates to a wheel alignment adjustment system.

2. Description of Related Art

For example, Japanese Examined Utility Model Application Publication No. 7-14127 (JP 7-14127 Y) (Japanese Unexamined Utility Model Application Publication No. 01-104867 (JP 01-104867 U)) and Japanese Unexamined Patent Application Publication No. 2017-197030 (JP 2017-197030 A) describe wheel alignment adjustment devices.

The wheel alignment adjustment device described in JP 7-14127 Y (JP 01-104867 U) includes a first socket and a second socket placed pivotably and coaxially at a distance to face each other, and a driving portion configured to adjust wheel alignment by pivoting, by the first socket, a wheel alignment adjustment cam bolt passed through a bracket provided in a vehicle body, the driving portion being configured to fix the cam bolt to the bracket by tightening a locknut by the second socket.

The wheel alignment adjustment device described in JP 2017-197030 A includes an adjustment socket and a tightening socket placed pivotably and coaxially at a distance to face each other, and an operating portion and a controlling portion configured to adjust wheel alignment by pivoting, by the adjustment socket, a wheel alignment adjustment cam bolt passed through a bracket provided in a vehicle body, the operating portion and the controlling portion being configured to fix the cam bolt to the bracket by tightening a locknut by the tightening socket.

SUMMARY

JP 7-14127 Y (JP 01-104867 U) further describes that, after the first socket and the second socket are moved by a robot toward the cam bolt side and the locknut side, respectively, the first socket is fitted to the cam bolt by the driving portion, a cylinder, and a spring, and further, the second socket is fitted to the locknut.

However, there is no detailed description about the robot at all. Therefore, a specific technique to recognize the presence positions and postures of the cam bolt and the locknut and a specific technique to exactly place the first socket and the second socket on the cam bolt side and the locknut side are uncertain.

On this account, in JP 7-14127 Y (JP 01-104867 U), particularly in a case where the cam bolt and the locknut are placed in a very small space, it is difficult to judge whether or not the first socket and the second socket can be surely fitted to the cam bolt and the locknut.

In the meantime, JP 2017-197030 A does not have any specific description or suggestion that, after the adjustment socket and the tightening socket are moved to the cam bolt side and the locknut side, respectively, the adjustment socket is fitted to the cam bolt, and the tightening socket is fitted to the locknut.

In the meantime, Japanese Patent No. 6080407 (JP 6080407 B) (Japanese Unexamined Patent Application Publication No. 2014-13147 (JP 2014-13147 A)) describes a three-dimensional measuring device configured to measure a three-dimensional position of a workpiece based on respective images captured by two cameras having different eye points, and a robotic device including a robot arm configured to grip the workpiece based on the three-dimensional position thus measured by the three-dimensional measuring device.

In the three-dimensional measuring device and the robotic device, it is necessary to capture images of the same surface of the workpiece by the two cameras at the same time. Accordingly, a relatively large measurement area is required, and it is concerned that a lot of computing processes are required to acquire the three-dimensional position based on the respective images captured by the two cameras.

Here, if it is assumed that, with the use of the three-dimensional measuring device and the robotic device, the first socket (the adjustment socket) is fitted to the cam bolt, and the second socket (the tightening socket) is fitted to the locknut as described above, it is expected that it is difficult to capture images of the cam bolt and the locknut by the three-dimensional measuring device, particularly in a situation where the cam bolt and the locknut are placed in a very small space. Accordingly, it is difficult to fit the first socket (the adjustment socket) to the cam bolt by the robotic device and to surely fit the second socket (the tightening socket) to the locknut by the robotic device.

In view of such a circumstance, the disclosure provides a wheel alignment adjustment system in which, even in a situation where a cam bolt and a locknut of a vehicle targeted for wheel alignment adjustment are placed in a relatively narrow space, an adjustment socket can be fitted to a head of the cam bolt and a tightening socket can be fitted to the locknut with a relatively simple configuration.

A wheel alignment adjustment system according to an aspect of the disclosure includes an adjuster, a tightener, a support base, an actuator, a first camera, a second camera, and a control device. The adjuster includes an adjustment socket to be fitted to a head of a cam bolt passed through a bracket of a vehicle, the adjuster being configured to adjust wheel alignment by pivoting the cam bolt by the adjustment socket. The tightener includes a tightening socket to be fitted to a locknut threadedly engaged with the cam bolt, the tightener being configured to fix the cam bolt to the bracket by tightening the locknut by the tightening socket. The support base is configured to support the adjustment socket and the tightening socket such that the adjustment socket and the tightening socket are coaxially placed at a distance to face each other. The actuator is configured to change a posture and a position of the support base. The first camera is configured to capture a first actual image of at least one of the cam bolt and the locknut in a first direction. The second camera is configured to capture a second actual image of at least one of the cam bolt and the locknut in a second direction different from the first direction. The control device is configured to control the first camera, the second camera, and the actuator. The control device acquires a first two-dimensional position of at least one of the cam bolt and the locknut in the first direction based on the first actual image captured by the first camera, and based on the acquired first two-dimensional position, the control device moves the adjustment socket to a position where the adjustment socket is fittable to the head of the cam bolt and moves the tightening socket to a position where the tightening socket is fittable to the locknut. Then, the control device acquires a second two-dimensional position of at least one of the cam bolt and the locknut in the second direction based on the second actual image captured by the second camera, and based on the acquired second two-dimensional position, the control device corrects a position of the adjustment socket relative to the head of the cam bolt and a position of the tightening socket relative to the locknut.

In this configuration, the two-dimensional position of at least one of the cam bolt and the locknut in the first direction in a space is grasped by the first camera, and then, an operation (referred to as a first stage of an advance preparation operation for wheel alignment adjustment) to move the adjustment socket to a position where the adjustment socket is fittable to the head of the cam bolt and the tightening socket to a position where the tightening socket is fittable to the locknut, respectively, is performed. Accordingly, even in a situation where the cam bolt and the locknut of the vehicle targeted for wheel alignment adjustment are placed in a relatively narrow space, the first stage of the advance preparation operation can be performed with a configuration simpler than the three-dimensional measuring device and the robotic device as described in JP 6080407 B (JP 2014-13147 A).

Besides, in the above configuration, after the first stage is performed, a two-dimensional position of at least one of the cam bolt and the locknut in the second direction in the space is grasped by the second camera, and an operation (referred to as a second stage of the advance preparation operation) to correct the position of the adjustment socket relative to the head of the cam bolt and the position of the tightening socket relative to the locknut is performed as needed. Accordingly, the adjustment socket can be surely fitted to the head of the cam bolt and the tightening socket can be surely fitted to the locknut.

Thus, the wheel alignment adjustment system according to the aspect of the disclosure can contribute to improvement of the efficiency of a series of operations. For example, the wheel alignment adjustment operation can be started in a short time after the advance preparation operation for the wheel alignment adjustment is performed.

Further, the wheel alignment adjustment system may be configured such that: the cam bolt is placed laterally along a horizontal direction; the first camera is provided in the support base so as to capture an image from one side in a radial direction of the cam bolt; and the second camera is attached near the adjustment socket on the support base so as to capture an image from a side of a first end of the cam bolt in an axial direction of the cam bolt.

In this configuration, the first camera is provided in the support base, and the second camera is attached to the back of the tightening socket on the support base.

This is advantageous to simplify the configuration of the wheel alignment adjustment system in comparison with a case where the first and second cameras are provided separately from the support base.

Further, the control device may be configured to: acquire a first reference image of at least one of a reference cam bolt and a reference locknut of a reference vehicle in which wheel alignment is adjusted appropriately, the first reference image being captured by the first camera, and acquire a second reference image of at least one of the reference cam bolt and the reference locknut of the reference vehicle, the second reference image being captured by the second camera; acquire the first actual image of the at least one of the cam bolt and the locknut of the vehicle targeted for wheel alignment adjustment captured by the first camera; measure a first positional deviation of the first actual image from the first reference image and, based on the measured first positional deviation, set a first target position such that the adjustment socket is moved to the position where the adjustment socket is fittable to the head of the cam bolt and the tightening socket is moved to the position where the tightening socket is fittable to the locknut; control the actuator to move the adjustment socket and the tightening socket to the first target position; acquire the second actual image of the at least one of the cam bolt and the locknut of the vehicle targeted for wheel alignment adjustment captured by the second camera; measure a second positional deviation of the second actual image from the second reference image and, based on the measured second positional deviation, set a second target position such that the position of the adjustment socket relative to the head of the cam bolt and the position of the tightening socket relative to the locknut are corrected; control the actuator to move the adjustment socket and the tightening socket to the second target position; and fit the adjustment socket to the head of the cam bolt and fit the tightening socket to the locknut.

Herein, as the advance preparation operation for the wheel alignment adjustment, a content of a process of moving the adjustment socket to the position where the adjustment socket is fittable to the head of the cam bolt and a content of a process of moving the tightening socket to the position where the tightening socket is fittable to the locknut are specified, and a mounting process of fitting the adjustment socket to the head of the cam bolt and fitting the tightening socket to the locknut is added.

This specification makes it clearer that the advance preparation operation for the wheel alignment adjustment can be performed with a relatively simple configuration.

With the wheel alignment adjustment system according to the aspect of the disclosure, even in a situation where the cam bolt and the locknut of the vehicle targeted for the wheel alignment adjustment are placed in a relatively narrow space, the adjustment socket can be fitted to the head of the cam bolt and the tightening socket can be fitted to the locknut with a relatively simple configuration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes the best mode for carrying out the disclosure in detail with reference to the attached drawings.

One embodiment of the disclosure is illustrated in FIGS. 1 to 7B. In order to enhance driving performance of a vehicle 10, alignment (toe angle, camber angle, caster angle, and the like) of wheels of tire-wheel assemblies attached to the vehicle 10 has been conventionally adjusted.

Figure 2:
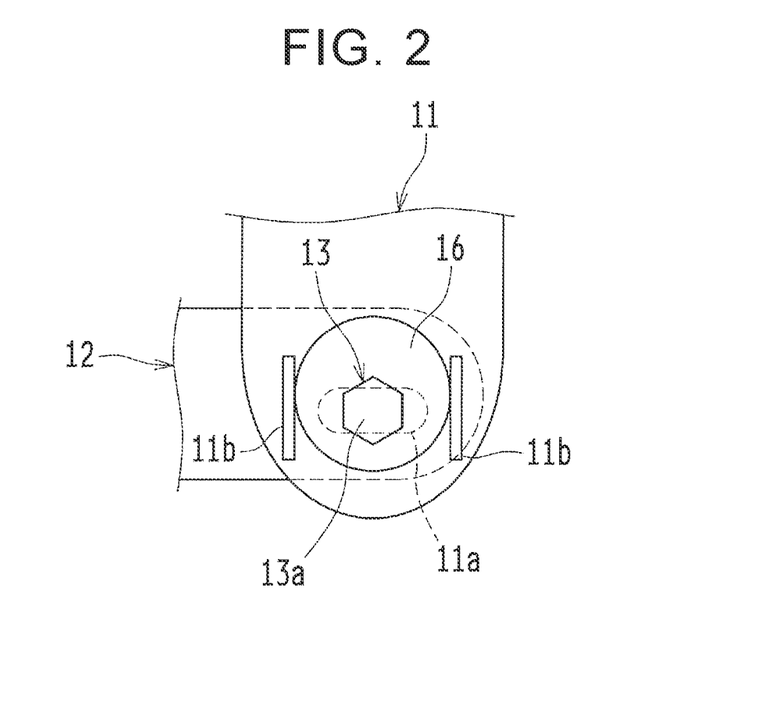
FIG. 2 is a side view illustrating a head side of a cam bolt at a connecting portion between a bracket on a suspension member side and an arm.
Figure 3:
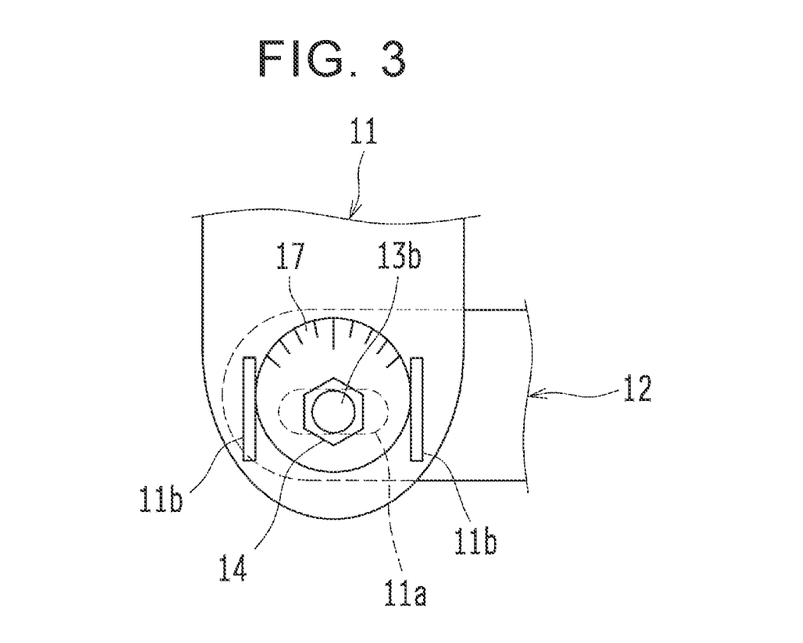
FIG. 3 is a side view illustrating a locknut side at the connecting portion between the bracket on the suspension member side and the arm.

The adjustment of wheel alignment is performed by pivoting a cam bolt 13 and a locknut 14 configured to connect a bracket 11 on a suspension member side to an arm 12 an end of which is connected to the tire-wheel assembly, as illustrated in FIGS. 2 and 3.

The cam bolt 13 includes a head 13a having a hexagonal outer peripheral surface, and a threaded shaft 13b, and is passed through a bush 15 (illustrated only in FIG. 1) so as to penetrate through a bolt insertion hole 11a of the bracket 11.

Note that the cam bolt 13 is placed with a lateral posture along the horizontal direction. This lateral posture includes a posture inclined appropriately from the horizontal direction as well as a posture completely along the horizontal direction. Further, as illustrated in FIGS. 2 and 3, the bolt insertion hole 11a has an elongate-hole shape like an oval shape that is not a round shape.

The locknut 14 has a hexagonal outer peripheral surface and is threadedly engaged with a part of the cam bolt 13, the part projecting from the bolt insertion hole 11a of the bracket 11.

An adjusting cam plate 16 is attached to the head 13a of the cam bolt 13 so that the adjusting cam plate 16 rotates together with the head 13a in an integrated manner. A tightening cam plate 17 is placed between the locknut 14 and the bracket 11 in a sandwiched manner. The tightening cam plate 17 is fitted to the threaded shaft 13b of the cam bolt 13 so that the tightening cam plate 17 rotates together with the threaded shaft 13b of the cam bolt 13 in an integrated manner. Each of the adjusting cam plate 16 and the tightening cam plate 17 is placed between a pair of cam receiving portions 11b of the bracket 11.

Note that, as conventionally known, when the adjusting cam plate 16 is rotated counterclockwise or clockwise by the cam bolt 13, the cam bolt 13 slides leftward or rightward inside the bolt insertion hole 11a constituted by an elongate hole, so that the position of the arm 12 relative to the bracket 11 is changed. Thus, wheel alignment is adjusted.

Figure 1:
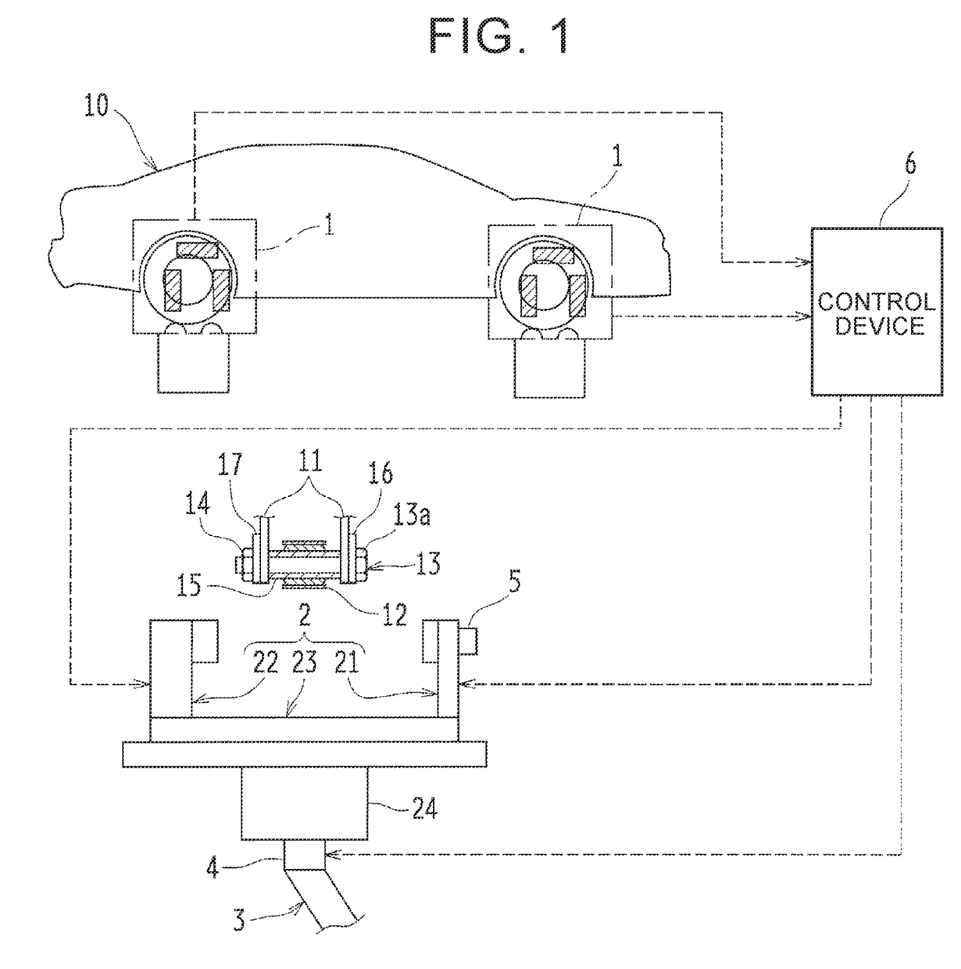
FIG. 1 is a schematic configuration diagram illustrating one embodiment of a wheel alignment adjustment system according to the aspect.

As illustrated in FIG. 1, the wheel alignment adjustment system in the present embodiment includes a wheel alignment measuring instrument 1, an adjusting device 2, an actuator 3, a first camera 4, a second camera 5, a control device 6, and so on.

The wheel alignment measuring instrument 1 is configured to measure wheel alignment of the tire-wheel assembly attached to the vehicle 10 and has a well-known configuration.

The adjusting device 2 is configured to adjust the wheel alignment based on an operation command from the control device 6 and includes an adjuster 21, a tightener 22, and a support base 23.

The adjuster 21 is configured to adjust the wheel alignment by pivoting the cam bolt 13 (to rotate counterclockwise or clockwise), and the adjuster 21 includes an adjustment socket 21a (FIG. 5A) to be fitted to the head 13a of the cam bolt 13 and driving means (not shown) configured to pivot the adjustment socket 21a.

The tightener 22 is configured to tighten and loosen the locknut 14 threadedly engaged with the cam bolt 13, and the tightener 22 includes a tightening socket 22a (FIG. 5A) to be fitted to the locknut 14 and driving means (not shown) configured to pivot the tightening socket 22a.

Note that the driving means of the adjuster 21 and the driving means of the tightener 22 can be configured, for example, in a similar manner to a well-known configuration including a motor, a gear mechanism, and so on (e.g., JP 7-14127 Y (JP 01-104867 U), JP 2017-197030 A, and so on), so detailed illustrations and descriptions are omitted herein.

The support base 23 supports the adjuster 21 and the tightener 22 such that the adjustment socket 21a and the tightening socket 22a are coaxially placed at a distance to face each other.

Note that the support base 23 is provided with displacement means (not shown) configured to linearly displace the tightener 22 such that the tightener 22 approaches or separates from the adjuster 21, and a floating portion 24 configured to absorb a very small gap caused when the adjustment socket 21a and the tightening socket 22a are fitted to the head 13a of the cam bolt 13 and the locknut 14, respectively. Note that the displacement means can be configured in a similar manner to a well-known configuration (e.g., a linear motion cylinder or the like described in JP 7-14127 Y (JP 01-104867 U) or JP 2017-197030 A), so detailed illustrations and descriptions are omitted herein.

The actuator 3 is configured to change the posture and position of the adjusting device 2 based on an operation command from the control device 6 and is, for example, a robot arm.

The actuator 3 is configured to perform, for example, an operation to move the support base 23 in two horizontal directions (the X-axis direction and the Y-axis direction), an operation to move the support base 23 in the vertical direction (the Z-axis direction), an operation (also referred to as a lateral swing operation) to pivot the support base 23 around the vertical line (the Z-axis), and an operation (also referred to as a vertical swing operation) to incline the support base 23 in the vertical direction. The actuator 3 can have, for example, a well-known configuration including a multi-joint mechanism, a motor, a power transmission mechanism, and so on. Detailed illustrations and descriptions are omitted herein.

The first camera 4 is provided in the support base 23 so that the first camera 4 can capture an image of at least one of the cam bolt 13 and the locknut 14 in a first direction, that is, from one side in the radial direction of the cam bolt 13. Note that the "radial direction" indicates a direction intersecting with the axial direction of the cam bolt 13. In the present embodiment, the first camera 4 captures an image of bottom faces of the cam bolt 13 and the locknut 14.

The second camera 5 is attached to the back of the adjustment socket 21a on the support base 23 so that the second camera 5 can capture an image of at least one of the cam bolt 13 and the locknut 14 in a second direction (e.g., a side of a first end of the cam bolt 13 in an axial direction of the cam bolt 13) different from the first direction. In the present embodiment, the second camera 5 captures an image of an end surface of the head 13a of the cam bolt 13. Further, the second camera 5 is placed such that its eye point center agrees with the bore center of the adjustment socket 21a.

The control device 6 has a program for adjusting the wheel alignment by controlling the operation of the adjusting device 2 in accordance with a measurement result of the wheel alignment measuring instrument 1. In addition, the control device 6 has a program or the like for performing an advance preparation operation for the wheel alignment adjustment by changing the posture and position of the adjusting device 2.

Similarly to a general technique, the program for the wheel alignment adjustment adjusts the wheel alignment by appropriately rotating the cam bolt 13 counterclockwise or clockwise by the adjuster 21 so as to correct a deviation of a measured value measured by the wheel alignment measuring instrument 1 from a target value for the wheel alignment. After that, the cam bolt 13 is fixed to the bracket 11 by tightening the locknut 14 by the tightener 22.

As will be described later in detail, the following operations are performed in accordance with the program for the advance preparation operation. That is, two-dimensional images of a reference cam bolt and a reference locknut of a reference vehicle in which wheel alignment is adjusted appropriately are acquired as first and second reference images, the two-dimensional images being captured by the first camera 4 and the second camera 5. Two-dimensional images of the cam bolt 13 and the locknut 14 of the vehicle 10 targeted for the wheel alignment adjustment are acquired as first and second actual images, the two-dimensional images being captured by the first camera 4 and the second camera 5. Positional deviations of the first and second actual images from the first and second reference images are measured by a pattern matching technology and the like. Then, based on a measurement result obtained herein, the adjusting device 2 fits the adjustment socket 21a to the head 13a of the cam bolt 13 and fits the tightening socket 22a to the locknut 14.

Next will be described details of the advance preparation operation for the wheel alignment adjustment with reference to FIGS. 4 to 7B.

Figure 4:
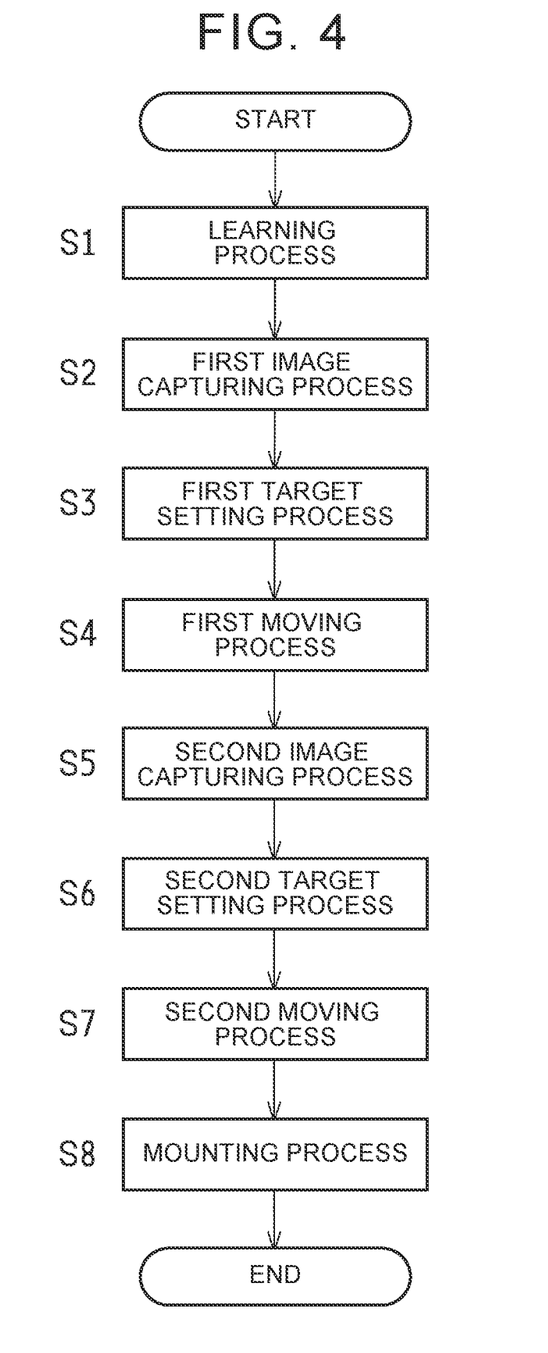
FIG. 4 is a view to describe an advance preparation operation for wheel alignment adjustment.

In step S1 in FIG. 4, the control device 6 executes a learning process. In this learning process, an image of the reference cam bolt and the reference locknut of the reference vehicle is captured by the first camera 4, and then, the captured image is acquired as a first reference image. Meanwhile, an image of an end surface of a head of the reference cam bolt of the reference vehicle is captured by the second camera 5, and the captured image is acquired as a second reference image.

Note that it is preferable that the eye point center of the first camera 4 at the time when the first reference image is captured be placed at the axially central position of the reference cam bolt. The position adjustment of the eye point can be performed by moving the support base 23 while the image captured by the first camera 4 is monitored, for example.

A reason to execute the learning process will be described.

In the first place, the support base 23 of the adjusting device 2 is controlled to move the adjustment socket 21a and the tightening socket 22a to a position (referred to as a reference target position) at which the adjustment socket 21a and the tightening socket 22a are fittable to the head of the reference cam bolt and the reference locknut of the reference vehicle, respectively. On this account, in a case where the cam bolt 13 and the locknut 14 of the vehicle 10 targeted for the wheel alignment adjustment are placed at the same position and with the same posture as the reference cam bolt and the reference locknut of the reference vehicle, an actual moving target position of the support base 23 does not need to be changed to the reference target position.

However, in a case where the cam bolt 13 and the locknut 14 of the vehicle 10 are not placed at the same position and with the same posture as the reference cam bolt and the reference locknut of the reference vehicle, the following advance preparation operation (see steps S2 to S8 in FIG. 4) is required.

For reference, as factors that cause positional deviations of the cam bolt 13 and the locknut 14 of the vehicle 10 from the reference cam bolt and the reference locknut of the reference vehicle, the following four positional deviations are considered.

(1) A positional deviation (W) in the head 13a of the cam bolt 13 in the horizontal direction before and after adjustment of wheel alignment.

(2) The positional deviation (W) due to an accuracy deviation in a component to be used for each vehicle.

(3) A positional deviation (H) in the head 13a of the cam bolt 13 in the vertical direction due to a vehicle height deviation of each vehicle.

(4) A stop position deviation of a vehicle from the wheel alignment measuring instrument 1.

Note that the advance preparation operation includes a first stage indicated by steps S2 to S4 in FIG. 4, and a second stage indicated by steps S5 to S8 in FIG. 4.

Figure 5A:
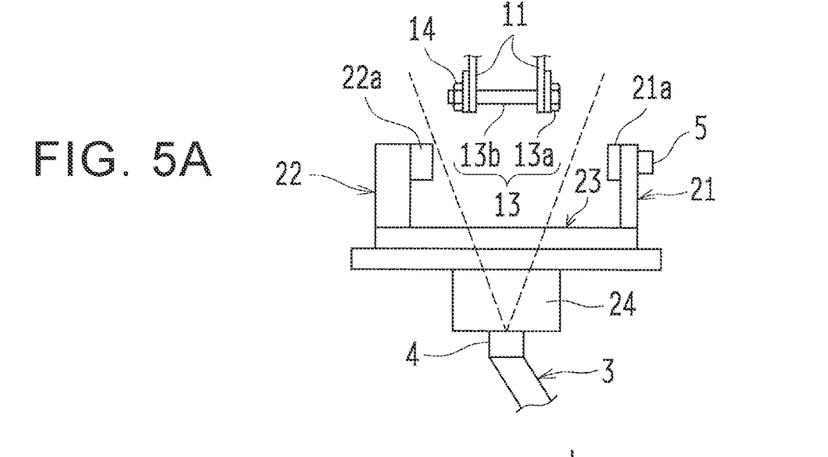
FIG. 5A is a view to describe step S2 in the advance preparation operation for the wheel alignment adjustment.

In step S2 (a first image capturing process) in FIG. 4, an image of the bottom faces of the cam bolt 13 and the locknut 14 of the vehicle 10 targeted for the wheel alignment adjustment is captured by the first camera 4, and the captured image is acquired as a first actual image, as illustrated in FIG. 5A. Note that it is preferable that the eye point center of the first camera 4 at the time when the first actual image is captured be placed at the same position as that at the time of capturing the first reference image.

In step S3 (a first target setting process) in FIG. 4, a positional deviation (a first positional deviation) of the first actual image from the first reference image is measured by a pattern matching technology and the like, and based on this measurement result, a first target position based on which the adjustment socket 21a is moved to a position where the adjustment socket 21a is fittable to the head 13a of the cam bolt 13 and the tightening socket 22a is moved to a position where the tightening socket 22a is fittable to the locknut 14 is set.

Figure 5B:
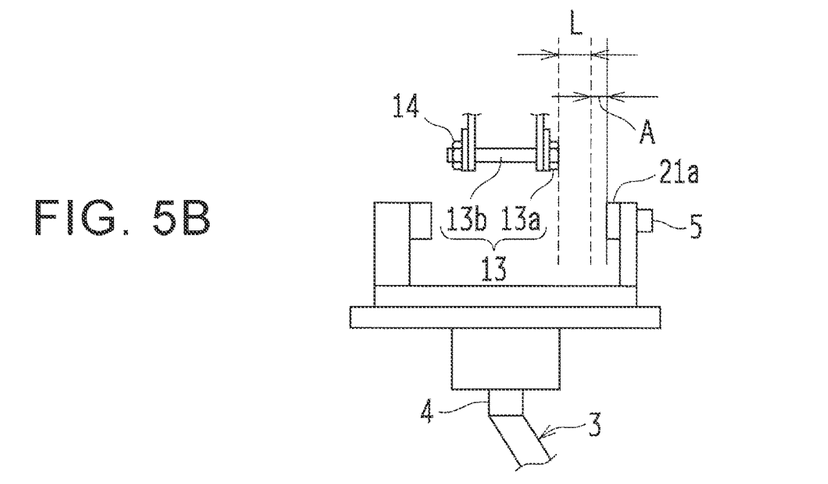
FIG. 5B is a view to describe step S3 in the advance preparation operation for the wheel alignment adjustment.

Note that, in the present embodiment, the image of the bottom faces of the cam bolt 13 and the locknut 14 is captured by the first camera 4. Accordingly, as illustrated in FIG. 5B, an axial positional deviation (a value obtained by adding a standard gap A to an actual positional deviation L) of the head 13a of the cam bolt 13, a horizontal positional deviation (W) (not shown) of the head 13a of the cam bolt 13, and a horizontal inclination angle (a lateral swing angle θ) (not shown) of the central axis of the cam bolt 13 can be measured.

As can be understood from this, two-dimensional positions (positions in two axial directions intersecting in the horizontal direction) of the cam bolt 13 and the locknut 14 in a space can be measured based on the image captured by the first camera 4. In the meantime, positions of the cam bolt 13 and the locknut 14 in the space along the vertical direction cannot be measured, so the positions in the vertical direction are measured based on an image captured by the second camera 5 as follows.

Figure 5C:
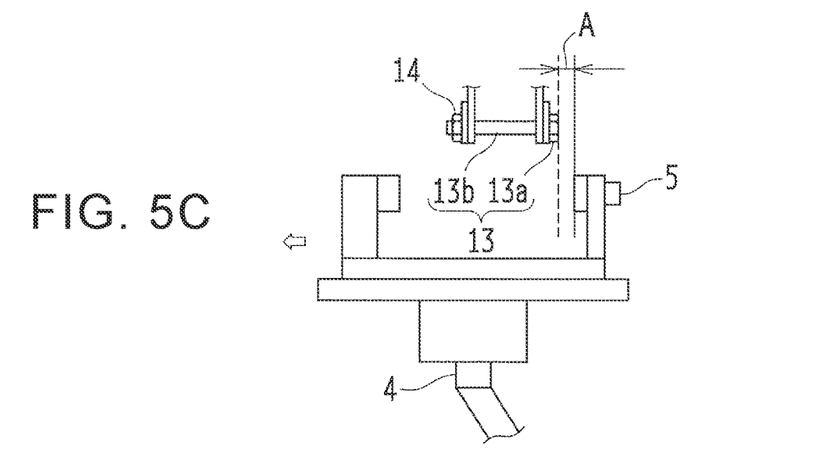
FIG. 5C is a view to describe step S4 in the advance preparation operation for the wheel alignment adjustment.

In step S4 (a first moving process) in FIG. 4, the posture and position of the support base 23 are appropriately changed by the actuator 3, so that the adjustment socket 21a and the tightening socket 22a are moved to the first target position, as illustrated in FIG. 5C.

Figure 6A:
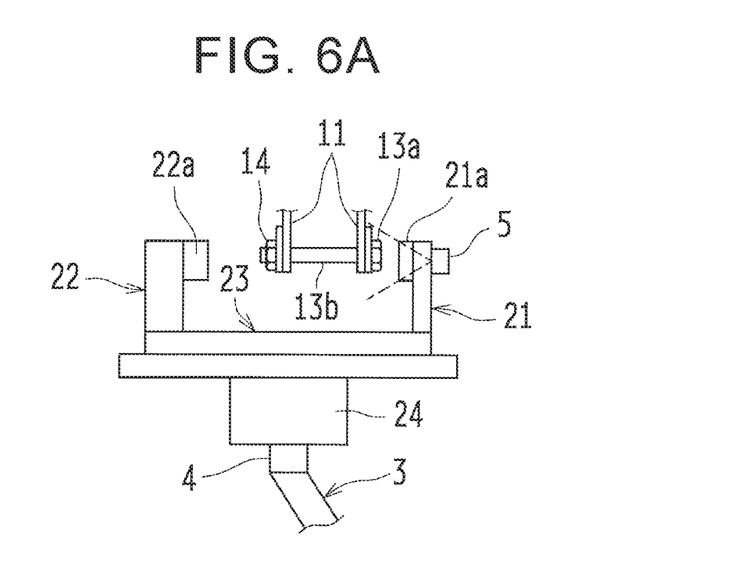
FIG. 6A is a view to describe step S5 in the advance preparation operation for the wheel alignment adjustment.

In step S5 (a second image capturing process) in FIG. 4, an image of the end surface of the head 13a of the cam bolt 13 of the vehicle 10 is captured by the second camera 5, and the captured image is acquired as a second actual image, as illustrated in FIG. 6A.

In step S6 (a second target setting process) in FIG. 4, a positional deviation (a second positional deviation) of the second actual image from the second reference image is measured by a pattern matching technology and the like, and based on this measurement result, a second target position based on which the position of the adjustment socket 21a relative to the head 13a of the cam bolt 13 and the position of the tightening socket 22a relative to the locknut 14 are corrected is set.

Figure 6B:
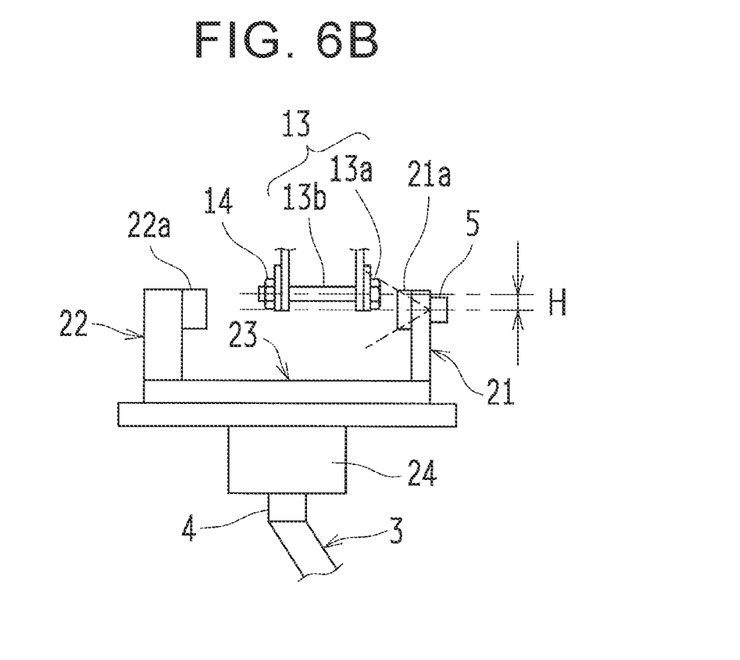
FIG. 6B is a view to describe step S6 in the advance preparation operation for the wheel alignment adjustment.

Note that, in the present embodiment, the image of the end surface of the head 13a of the cam bolt 13 is captured by the second camera 5. Accordingly, as illustrated in FIG. 6B, a vertical positional deviation (H) of the head 13a of the cam bolt 13 and a horizontal positional deviation (W) (not shown) of the head 13a of the cam bolt 13 can be measured. That is, since the eye point center of the second camera 5 agrees with the bore center of the adjustment socket 21a, it can be said that the positional deviation of the second actual image from the second reference image is equivalent to the positional deviation of the adjustment socket 21a from the head 13a of the cam bolt 13.

Figure 7A:
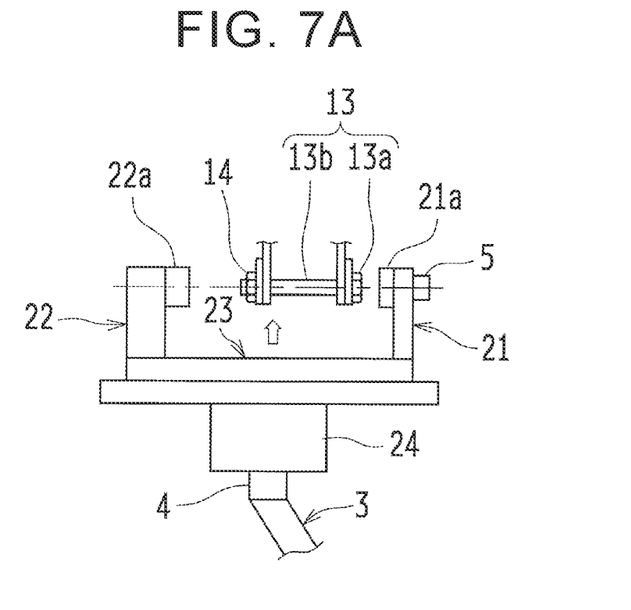
FIG. 7A is a view to describe step S7 in the advance preparation operation for the wheel alignment adjustment.

In step S7 (a second moving process) in FIG. 4, the posture and position of the support base 23 are appropriately changed by the actuator 3, so that the adjustment socket 21a and the tightening socket 22a are moved to the second target position, as illustrated in FIG. 7A.

Figure 7B:
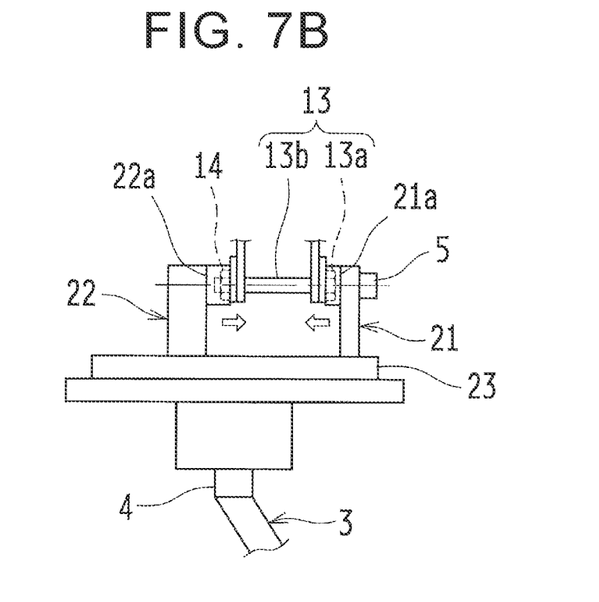
FIG. 7B is a view to describe step S8 in the advance preparation operation for the wheel alignment adjustment.

In step S8 (a mounting process) in FIG. 4, the adjustment socket 21a is fitted to the head 13a of the cam bolt 13 and the tightening socket 22a is fitted to the locknut 14 by the displacement means (not shown), as illustrated in FIG. 7B.

After the advance preparation operation for the wheel alignment adjustment is performed, the wheel alignment adjustment is shifted to an actual wheel alignment adjustment operation.

As described above, in the wheel alignment adjustment, the adjusting device 2 is operated based on a deviation of the measured value measured by the wheel alignment measuring instrument 1 from the target value for wheel alignment.

As described above, in the embodiment to which the disclosure is applied, the two-dimensional positions of the cam bolt 13 and the locknut 14 in the first direction in the space is grasped by the first camera 4, and then, an operation (the first stage of the advance preparation operation for the wheel alignment adjustment) to move the adjustment socket 21a and the tightening socket 22a to the position where the adjustment socket 21a is fittable to the head 13a of the cam bolt 13 and the position where the tightening socket 22a is fittable to the locknut 14, respectively, is performed. Accordingly, even in a situation where the cam bolt 13 and the locknut 14 of the vehicle 10 targeted for the wheel alignment adjustment are placed in a relatively narrow space, the first stage of the advance preparation operation can be performed with a configuration simpler than the three-dimensional measuring device and the robotic device as described in JP 6080407 B (JP 2014-13147 A).

Besides, in the above embodiment, after the first stage is performed, the two-dimensional positions of the cam bolt 13 and the locknut 14 in the second direction in the space are grasped by the second camera 5, and then, an operation (the second stage of the advance preparation operation) to correct the position of the adjustment socket 21a relative to the head 13a of the cam bolt 13 and the position of the tightening socket 22a relative to the locknut 14 is performed as needed. Accordingly, the adjustment socket 21a can be surely fitted to the head 13a of the cam bolt 13 and the tightening socket 22a can be surely fitted to the locknut 14. Note that, the two-dimensional position of at least one of the cam bolt 13 and the locknut 14 acquired by the control device 6 based on the image captured by the first camera 4 is also referred to "a first two-dimensional position", and the two-dimensional position of at least one of the cam bolt 13 and the locknut 14 acquired by the control device 6 based on the image captured by the second camera 5 is also referred to "a second two-dimensional position".

Thus, the wheel alignment adjustment system of the embodiment can contribute to improvement of the efficiency of a series of operations. For example, the wheel alignment adjustment operation can be started in a short time after the advance preparation operation for the wheel alignment adjustment is performed.

The disclosure is not limited to the above embodiment but can be modified appropriately within the scope of Claims and within a scope equivalent thereto.

(1) The above embodiment deals with an example in which an image of the bottom faces of the cam bolt 13 and the locknut 14 is captured by the first camera 4, and an image of the end surface of the head 13a of the cam bolt 13 is captured by the second camera 5. However, the disclosure is not limited to this.

(2) The above embodiment deals with an example in which the first camera 4 is provided in the support base 23. However, the disclosure is not limited to this, and the first camera 4 can be provided separately from the support base 23, for example.

(3) The above embodiment deals with an example in which the second camera 5 is attached to the back of the adjustment socket 21a on the support base 23. However, the disclosure is not limited to this, and the second camera 5 can be placed in the upper end of the adjuster 21, for example.

In this case, the eye point center of the second camera 5 is placed to be offset from the bore center of the adjustment socket 21a, and therefore, it is necessary to correct the offset when the first and second target positions are set.

Further, the second camera 5 is also placeable on the back of the tightening socket 22a or in the upper end of the tightener 22.

(4) The above embodiment deals with an example in which the first and second target positions are set based on the positional deviations of the first and second actual images from the first and second reference images, and the adjustment socket 21a and the tightening socket 22a are moved to the first and second target positions. However, the disclosure is not limited to this.

Although not illustrated herein, the disclosure also includes an embodiment in which respective two-dimensional positions of the cam bolt 13 and the locknut 14 are measured only based on the first and second actual images without acquiring the first and second reference images, the two-dimensional positions are set as the first and second target positions, and the adjustment socket 21a and the tightening socket 22a are moved to the first and second target positions.

(5) The above embodiment deals with an example in which an image including both of the cam bolt 13 and the locknut 14 is captured by the first camera 4, and an image of the end surface of the head 13a of the cam bolt 13 is captured by the second camera 5. However, the disclosure is not limited to this.

For example, an image of at least one of the cam bolt 13 and the locknut 14 can be captured by the first camera 4, and an image of the locknut 14 can be captured by the second camera 5. In this case, a two-dimensional position of the other one of the cam bolt 13 and the locknut 14 is estimated based on the image captured by the first camera 4. This is advantageous to grasp the two-dimensional positions of the cam bolt 13 and the locknut 14.

The above aspect is preferably applicable to a wheel alignment adjustment system.

What is claimed is:

1. A wheel alignment adjustment system comprising:
   an adjuster including an adjustment socket to be fitted to a head of a cam bolt passed through a bracket of a vehicle, the adjuster being configured to adjust wheel alignment by pivoting the cam bolt by the adjustment socket;
   a tightener including a tightening socket to be fitted to a locknut threadedly engaged with the cam bolt, the tightener being configured to fix the cam bolt to the bracket by tightening the locknut by the tightening socket;
   a support base configured to support the adjustment socket and the tightening socket such that the adjustment socket and the tightening socket are coaxially placed at a distance to face each other;
   an actuator configured to change a posture and a position of the support base;
   a first camera configured to capture a first actual image of at least one of the cam bolt and the locknut in a first direction;
   a second camera configured to capture a second actual image of at least one of the cam bolt and the locknut in a second direction different from the first direction; and
   a control device configured to control the first camera, the second camera, and the actuator, wherein:
   the control device acquires a first two-dimensional position of at least one of the cam bolt and the locknut in the first direction based on the first actual image captured by the first camera, and based on the acquired first two-dimensional position, the control device moves the adjustment socket to a position where the adjustment socket is fittable to the head of the cam bolt and moves the tightening socket to a position where the tightening socket is fittable to the locknut; and
   then, the control device acquires a second two-dimensional position of at least one of the cam bolt and the locknut in the second direction based on the second actual image captured by the second camera, and based on the acquired second two-dimensional position, the control device corrects a position of the adjustment socket relative to the head of the cam bolt and a position of the tightening socket relative to the locknut.

2. The wheel alignment adjustment system according to claim 1, wherein:
   the cam bolt is placed laterally along a horizontal direction;
   the first camera is provided in the support base so as to capture an image from one side in a radial direction of the cam bolt; and
   the second camera is attached near the adjustment socket on the support base so as to capture an image from a side of a first end of the cam bolt in an axial direction of the cam bolt.

3. The wheel alignment adjustment system according to claim 2, wherein:
   the control device is configured to:
     acquire a first reference image of at least one of a reference cam bolt and a reference locknut of a reference vehicle in which wheel alignment is adjusted appropriately, the first reference image being captured by the first camera, and acquire a second reference image of at least one of the reference cam bolt and the reference locknut of the reference vehicle, the second reference image being captured by the second camera;
     acquire the first actual image of the at least one of the cam bolt and the locknut of the vehicle targeted for wheel alignment adjustment captured by the first camera;
     measure a first positional deviation of the first actual image from the first reference image and, based on the measured first positional deviation, set a first target position such that the adjustment socket is moved to the position where the adjustment socket is fittable to the head of the cam bolt and the tightening socket is moved to the position where the tightening socket is fittable to the locknut;
     control the actuator to move the adjustment socket and the tightening socket to the first target position;
     acquire the second actual image of the at least one of the cam bolt and the locknut of the vehicle targeted for wheel alignment adjustment captured by the second camera;
     measure a second positional deviation of the second actual image from the second reference image and, based on the measured second positional deviation, set a second target position such that the position of the adjustment socket relative to the head of the cam bolt and the position of the tightening socket relative to the locknut are corrected;
     control the actuator to move the adjustment socket and the tightening socket to the second target position; and
     fit the adjustment socket to the head of the cam bolt and fit the tightening socket to the locknut.

\* \* \* \* \*